Aug. 2, 1966　　　　R. W. CASHMAN　　　　3,263,293
CLAMPING APPARATUS

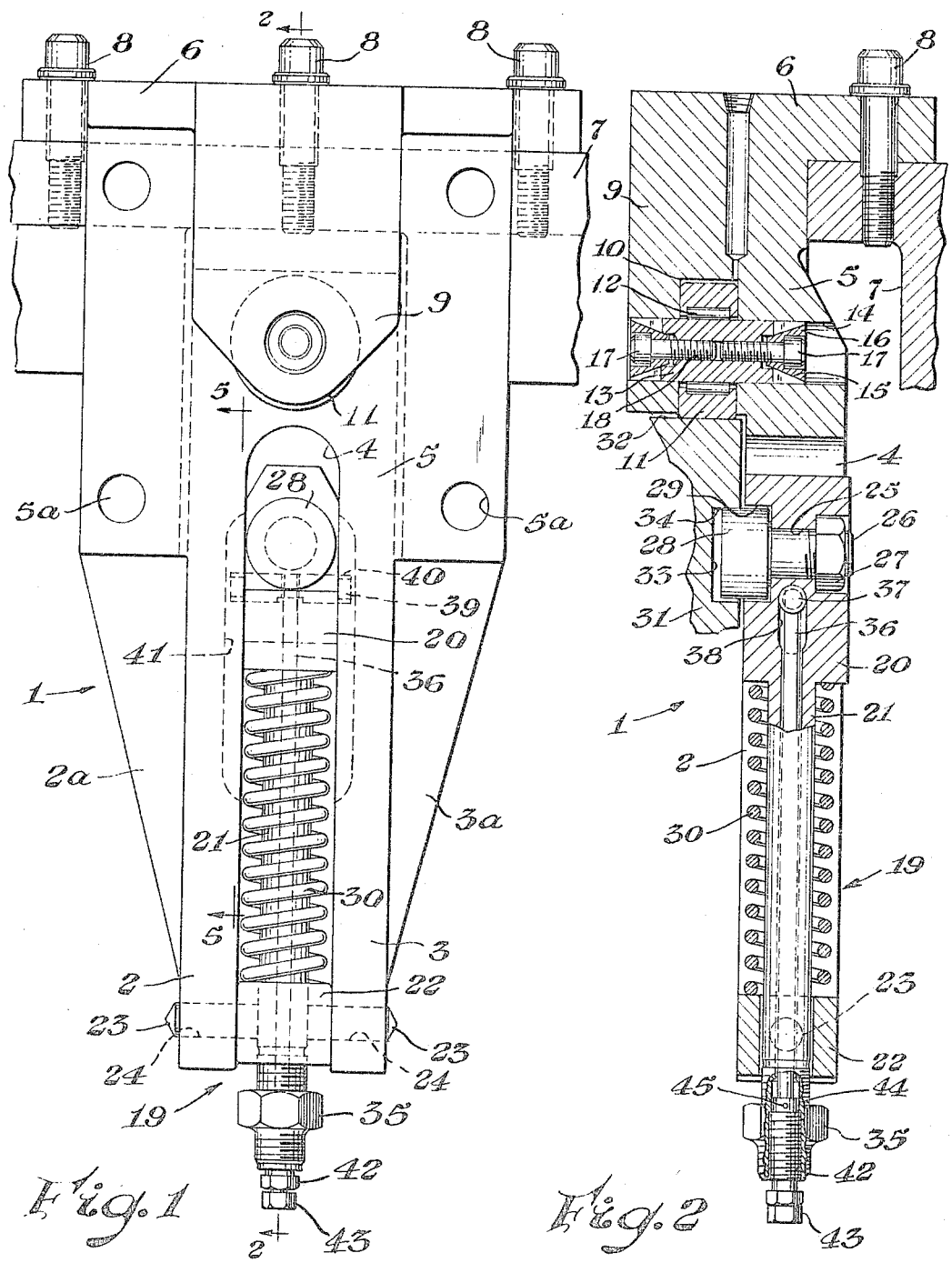

Original Filed Aug. 30, 1962　　　　　　　　　　　4 Sheets-Sheet 2

INVENTOR.
Robert W. Cashman
BY
Learman, Learman & McCulloch
ATTORNEYS

Aug. 2, 1966  R. W. CASHMAN  3,263,293
CLAMPING APPARATUS
Original Filed Aug. 30, 1962  4 Sheets-Sheet 3

INVENTOR.
Robert W. Cashman
BY
Learman, Learman & McCulloch
ATTORNEYS

Aug. 2, 1966 R. W. CASHMAN 3,263,293
CLAMPING APPARATUS
Original Filed Aug. 30, 1962 4 Sheets-Sheet 4

INVENTOR.
Robert W. Cashman
BY
Learman, Learman & McCulloch
ATTORNEYS

2

United States Patent Office 3,263,293
Patented August 2, 1966

3,263,293
CLAMPING APPARATUS
Robert W. Cashman, Saginaw, Mich., assignor to Saginaw Machine and Tool Company, Saginaw, Mich., a corporation of Michigan
Original application Aug. 30, 1962, Ser. No. 220,472, now Patent No. 3,178,789, dated Apr. 20, 1965. Divided and this application Feb. 5, 1965, Ser. No. 435,399
10 Claims. (Cl. 24—263)

This application is a division of application Serial No. 220,472, filed August 30, 1962, now Patent No. 3,178,789.

This invention relates to clamp apparatus and more particularly to clamping devices that are especially adapted for use as means for transmitting movement from one relatively movable member to another and avoiding any slackness or play when the direction of relative movement of such members is reversed.

There are many instances where it is desirable to interpose motion transmitting means between two relatively movable members for effecting movement of either member in response to movement of the other. The prior art contains many examples of motion transmitting devices which are capable of functioning satisfactorily if a relatively small amount of play or looseness is not objectionable. However, in precision automatic machinery of the kind adapted to produce workpieces to extremely close tolerances, the presence of any play in the motion transmitting mechanism often manifests itself in the production of workpieces which do not conform to the allowable tolerance limits. Consequently, it is not unusual for workpieces to be scrapped or, alternatively, subjected to a series of subsequent machining operations if they are to be manufactured in accordance with specifications. A very substantial reduction in unusable or unsatisfactory parts can be achieved if the looseness or play of the motion transmitting mechanism is eliminated or reduced.

An object of this invention is to provide clamping apparatus that readily lends itself to use as part of a motion transmitting mechanism and which has little or no inherent looseness or play.

Another object of the invention is to provide apparatus of the kind described which is adapted for use in conjunction with both rotary and translatory motion transmitting mechanisms.

A further object of the invention is to provide apparatus of the kind referred to which is simple in construction and economical to manufacture.

Another object of the invention is to provide apparatus such as has been described which is adjustable and provided with self-contained means for facilitating its assembly with and disassembly from other parts of the motion transmitting mechanisms of which it is a part.

A further object of the invention is to provide apparatus for transmitting motion from one relatively movable member to another and in which provision is made to prevent damage to the motion transmitting apparatus or to the relatively movable members.

Another object of the invention is to provide motion transmitting apparatus that is operable to transmit motion from one member to another or to permit relative movement between the members, according to the direction of such relative movement.

Other objects and advantages of the invention will be pointed out specifically or will become apparent from the following description when it is considered in conjunction with the appended claims and the accompanying drawings, in which:

FIGURE 1 is a fragmentary, elevational view illustrating clamp apparatus constructed according to one embodiment of the invention;

FIGURE 2 is a sectional view taken on the line 2—2 of FIGURE 1;

Figure 5:
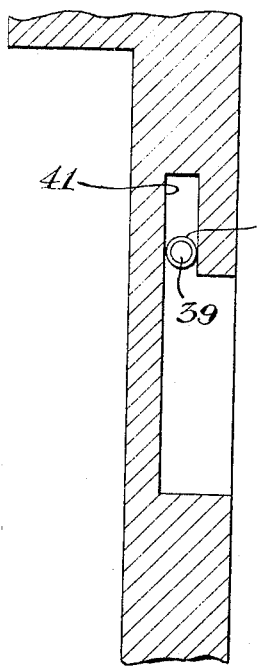
FIGURE 5 is a fragmentary, sectional view taken on the line 5—5 of FIGURE 1.

Apparatus constructed in accordance with the embodiment of the invention disclosed in FIGURES 1-5 comprises a mounting member or main body 1 having a pair of parallel arms or legs 2 and 3 which are spaced apart from one another by a longitudinally extending slot 4. The legs 2 and 3 are joined to one another at corresponding ends by a head 5 from which extends a mounting flange 6 that may be secured to a supporting member 7 by suitable means such as bolts 8. The member 7 preferably is mounted by means (not shown) for translatory movements. The arms 2 and 3 may include reinforcing members 2a and 3a, respectively, along their sides, and the head 5 may have openings 5a for mounting the latter on a member other than the member 7.

The head 5 is provided with a forwardly projecting block 9 which is transversely slotted as at 10 to accommodate a clamping wheel or roller 11. The roller 11 is journaled by bearings 12 on a shaft 13 which is received in an opening 14 formed in the head 5. The ends of the shaft are provided with conical seats 15 in which complementally shaped plugs 16 are received, and the shaft is maintained axially fixed by means of bolts 17 which extend through the members 16 and are threaded into a correspondingly threaded bore 18 formed in the shaft 13. The diameter of the clamping roller 11 and the mounting of the shaft 13 are such that the periphery of the roller 11 extends beyond the block 9.

The apparatus includes a second mounting member 19 comprising a body 20 of such size as slideably to fit between the arms 2 and 3 of the member 1, the body terminating at one end in an elongated, hollow stem 21, the free end of which is threaded both interiorly and exteriorly for a purpose that hereinafter will be explained. The stem 21 slideably extends through an opening formed in a pivoted block 22, the latter having laterally projecting posts 23 fixed thereto which are rockably received in openings 24 formed in the arms 2 and 3.

The body 20 is provided with a bore 25 that parallels the bore 14 in the head 5. Mounted in the bore 25 is a stub shaft 26 having a threaded end on which is mounted a correspondingly threaded nut 27. The opposite end of the shaft 26 mounts a second clamp wheel or roller 28 that is partially received in an annular recess 29 formed in the body 20 to such depth that about half the tread of the roller 28 projects beyond the face of the body 20.

The apparatus includes a yieldable force transmitting spring 30 which surrounds the stem 21 and reacts between the body 20 and the block 22 so as constantly to exert a force on the mounting member 19 tending to urge the clamp roller 28 toward the clamp roller 11. Consequently, the rollers 11 and 28 may exert clamping forces on opposed surfaces of a member interposed therebetween.

Various forms of members may be interposed between the clamp rollers 11 and 28. One such member may be rotatable cam 31 (FIGURE 2) having a cam surface 32 on which the roller 11 may ride and having a groove 33 formed in its side of such width and depth as to accommodate the roller 28 and provide a surface 34 parallel to the surface 32 and against which the periphery of the roller 28 may bear under the force of the spring 30.

When the rollers 11 and 28 are clamped against the surfaces 32 and 34, respectively, and when the cam 31 is rotated relatively to the member 7, a rise or fall of the cam surfaces will impart relative movement to the members 7 and 31 via the rollers 11 and 28 and their respective mounting devices. Inasmuch as the stem 21 of the member 19 is freely slidable in the pivoted block 22, the full force of the spring 30 may be utilized to maintain the roller 28 in forcible engagement with the surface 34 of the member 31. If there is no rise or fall of the cam surfaces the cam 31 may rotate relatively to the member 7 without effecting movement of the latter.

The capacity of the spring 30 should be such that it is capable of resisting normal forces tending to compress the spring so that there will be no tendency of the rollers 11 and 28 to move apart during normal operation of the apparatus, except as may be required by the contour of the cam surfaces 32 and 34. Thus, although the opposed surfaces 32 and 34 are forcibly engaged by the rollers 11 and 28, respectively, and although the spring 30 is yieldable, its force is sufficient to avoid any play or looseness between the roller 11 and the cam surface 32 during normal operations of the apparatus. In the event of an abnormal force being exerted on one of the members 7 or 31, however, the spring 30 may yield to provide some protection against damaging the apparatus.

Since the spring 31 is quite powerful and exerts its full force to urge the roller 28 toward the roller 11, means is provided to overcome the force of the spring and effect movement of the roller 28 away from the roller 11 so as to facilitate mounting and dismounting of the clamp apparatus. The means for overcoming the force of the spring 30 comprises a nut 35 mounted on the threaded free end of the stem 21.

When the nut 35 is in the position shown in FIGURES 1 and 2, the stem 21 is capable of sliding in either direction through the block 22. When the nut is turned down against the block 22, however, continued rotation of the nut will cause the mounting member 19 to be moved relatively to the mounting member 1 in a direction to compress the spring 30 and to disengage the roller 28 from the surface 34 of the member 31. When the roller 28 has been disengaged from the surface 34, movement of the member 31 to the left, as viewed in FIGURE 2, will enable the clamp apparatus to be dismounted from the member 31.

In some instances it is not possible to effect such relative movement of the member 31 and the clamp apparatus. Consequently, means must be provided to permit substantially parallel relative movement of the rollers 11 and 28. It is for this reason that the block 22 is pivoted to the arms 2 and 3 of the member 1, thereby permitting the member 19 to be swung to the position indicated in FIGURE 3 and permit the roller 28 to be cleared from the groove 33 in the member 31.

Means is provided to disable inadvertent swinging movement of the member 19 and comprises a rod 36 that extends through the hollow stem 21. One end of the rod 36 is threaded and is received in a stabilizing bar 37 that lies athwart the body 29 in an elongated recess 38 formed in the latter. The bar 37 is longer than the width of the body 20 so as to extend beyond the opposite sides thereof. Each end of the bar 37 is reduced as at 39 and supports a roller 40. Each of the arms 2 and 3 of the body member 1 is provided on its inner surface with a longitudinally extending guide or groove 41 in which the associated roller 40 is received. Each groove 41 has a portion of its side walls removed (see FIGURE 5) to provide sufficient clearance to permit the rollers 40 to be inserted in and removed from the grooves 41.

The opposite end of the rod 36 extends through an exteriorly threaded, adjustable coupling 42. The coupling 42 is rotatably trapped on the rod 36 between a head 43 at the free end of the rod and a sleeve 44 that is pinned as at 45 to the rod between its ends. The coupling 42 is threadedly received within the stem 21. Rotation of the coupling 42 in one direction will cause the rod 36 to be extended or projected from the stem 21, such movement being permitted by the slot 38 formed in the body 20, thereby withdrawing the rollers 40 from the grooves 41 an amount sufficient to enable the member 19 to be swung about the axis of the pivot pin 23.

Figures 3, 4:
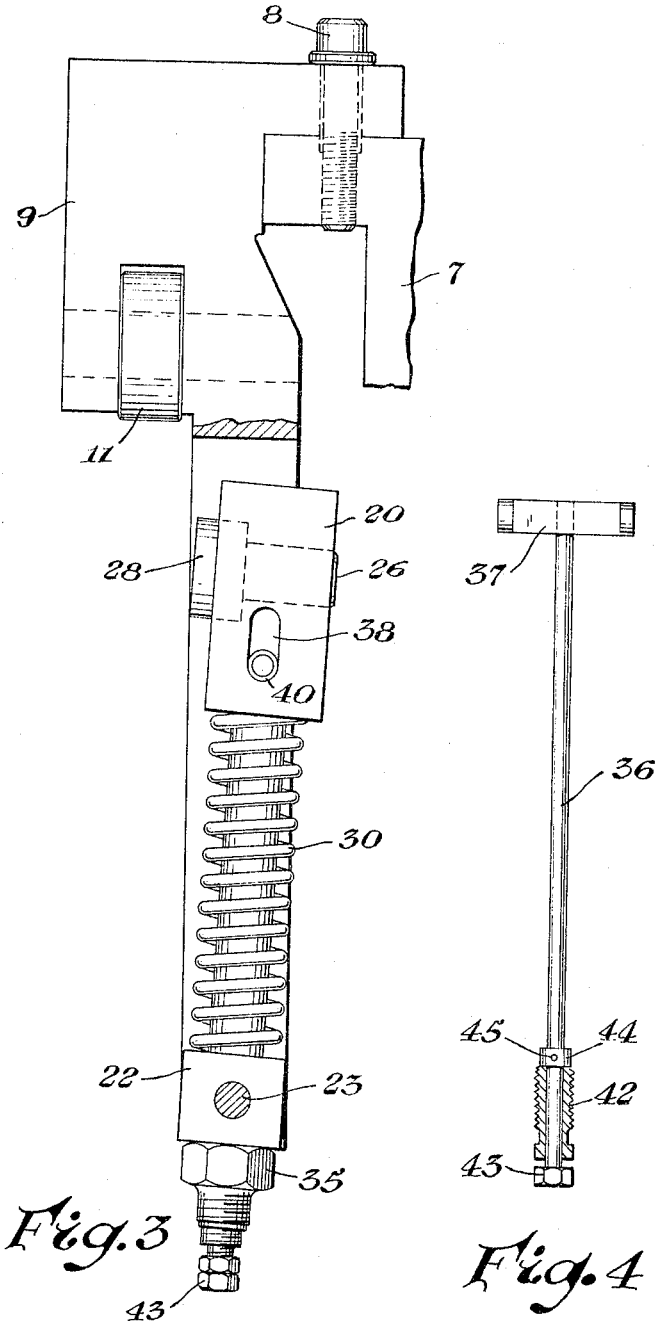
FIGURE 3 is a view generally similar to FIGURE 2, but illustrating certain parts of the apparatus in adjusted positions.
FIGURE 4 is a view partly in front elevation and partly in section of a portion of the apparatus shown in FIGURE 1.
Figure 6:
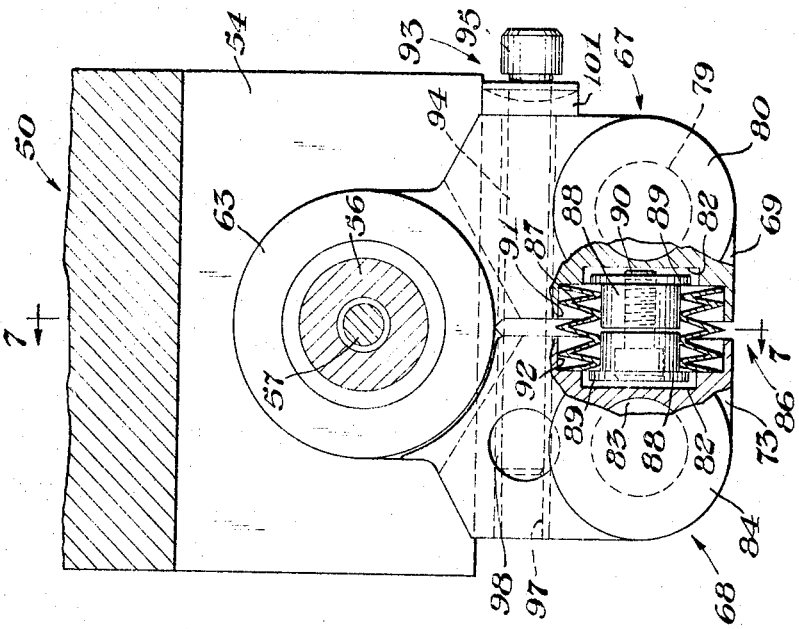
FIGURE 6 is a view partly in elevation and partly in section, with certain parts broken away, of a modified embodiment of the invention, the section being taken on the line 6—6 of FIGURE 7.

To restore the parts to the positions shown in FIGURE 2, the member 19 may be swung counterclockwise from the position shown in FIGURE 3 until the rollers 40 engage the sides of the recesses 41, whereupon the coupling 42 may be rotated in a direction to retract the rod 36 and trap the rollers 40 in the grooves 41. Thereafter, the nut 35 may be backed off, thereby enabling the spring 30 to expand and move the body, together with the roller 28, in a direction toward the other roller 11.

The embodiment of the invention shown in FIGURES 6–11 comprises a mounting member 50 that is provided with a pair of slots or recesses 51 and 52 at one end thereof, the slots being defined by parallel walls 53, 54 and 55. Each of the three walls is provided with an opening in which is accommodated a shaft 56 that is axially bored, and threaded at its central portion, to receive a pair of anchor bolts 57 having heads 58 that retain frusto-conical plugs 59 in correspondingly shaped seats 60 at the opposite ends of the shaft 56. The shaft 56 may have its side walls split at opposite ends as at 61 so as to enable the ends of the shaft to be expanded into fixed engagement with the walls 53 and 55 of member 50, thereby precluding axial movement of the shaft. The disclosed construction of the shaft and its mounting on the member 50 assure supporting of the shaft in such manner that its longitudinal axis is truly straight.

Received in the recess 51 is a clamping member or roller 63 that is mounted on the shaft 56 by means of suitable bearings, the diameter of the roller being such as to enable its peripheral edge to project beyond the member 50 for engagement with one surface 64 of a member 65 that is movable relatively to the member 50. The member 65 has an opposed surface 66 about which more subsequently will be said.

Received in the recess 52 is a pair of mounting arms or members 67 and 68. The member 67 comprises a body 69 (see FIGURES 8 and 9) from one end of which extends a pair of spaced, parallel ears 70 and 71, each of which is centrally apertured as at 72. The member 68 includes a body 73 (see FIGURES 10 and 11) from one end of which extends a pair of spaced, parallel ears 74 and 75, each of which is centrally apertured as at 76. The spacing between the ears of the respective members 67 and 68 is such as to permit the ear 71 of the member 67 to be received between the ears 74 and 75 of the member 68. The members 67 and 68 are rockably mounted on the shaft 56 by means of a bushing 77. The members 67 and 68, therefore, are rockable about a common axis and that axis also is common to the axis of rotation of the roller 63.

Figure 10:
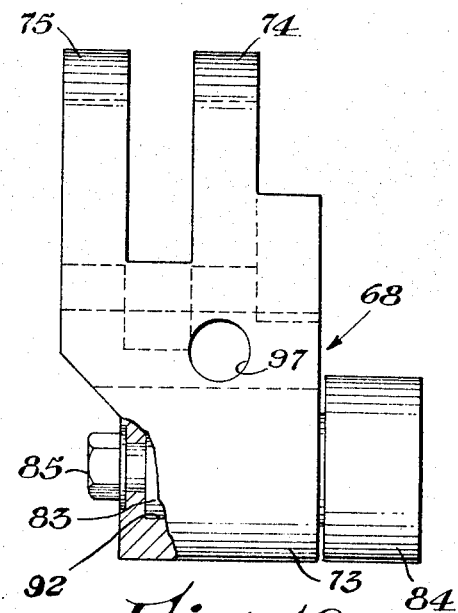
FIGURE 10 is a view similar to FIGURE 8, but illustrating another part of the apparatus shown in FIGURE 6.
Figure 11:
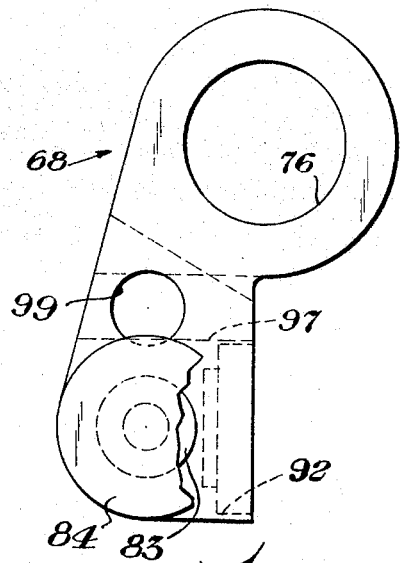
FIGURE 11 is a side elevational view of the apparatus shown in FIGURE 10.

The body 73 of the member 68 is laterally offset with respect to its ear 75, as is best shown in FIGURE 10.

As a consequence, the members 67 and 68 may be so mounted on the shaft 56 as to have their confronting faces directly opposite one another.

The member 67 is provided with a lateral bore 78 in which is received a stub shaft 79 on which is journaled a clamp roller 80. The shaft 79 is maintained fixed in the bore 78 by means of a bolt 81 that is threaded into the shaft 79. The member 68 is similarly bored as at 82 to receive a shaft 83 on which is mounted a similar clamp roller 84, and the shaft 83 similarly is fixed to the member 68 by means of a bolt 85. The rollers 80 and 84 are the same size and the members 67 and 68 are the same length. Consequently, a plane that is horizontal, as viewed in FIGURE 6, and tangent to the peripheries of both of the rollers 80 and 84 will be spaced from and parallel to a horizontal plane that is tangent to the periphery of the roller 63. The length of each member 67 and 68 is such that when the confronting faces thereof are in face-to-face engagement, or nearly so, the distance between the plane that is tangent to peripheries of the rollers 80 and 84 and the parallel plane that is tangent to the periphery of the roller 63 is greater than the thickness of the member 65.

Means 86 is provided for yieldably, but forcibly, urging the members 67 and 68 away from one another so as to enable the member 65 forcibly to be trapped between the sets of rollers. The force transmitting means comprises spring means such as a number of Belleville washers 87 mounted on a pair of cylindrical retainers 88, each of which has a flange 89 at one end thereof. The retainers 88 may be maintained assembled by means of a headed bolt 90. The confronting faces of the members 67 and 68 are provided with cylindrical recesses 91 and 92, respectively, of such size as to receive the spring washers 87, and the base of each recess is relieved to accommodate the flanges 89.

During assembly of the spring means 86 with the members 67 and 68, the latter are held apart a distance sufficient to permit the washers 87 and their retaining means to be received in the recesses 91 and 92. In this connection, the bolt 90 will be adjusted prior to assembly of the spring means with the clamp members in such manner that the washers 87 will be in a substantially relaxed condition. When the apparatus 86 is assembled with the members 67 and 68, the latter are rocked toward one another so as to capture the apparatus 86 therebetween. Normally, the washers 87 will prevent movement of the members 67 and 68 toward one another an amount sufficient to enable the member 66 to be interposed between the sets of rollers. Accordingly, means 93 is provided to overcome the force of the apparatus 86.

The means 93 comprises an elongated bolt 94 having a head 95 at one end and threads at its other end. The bolt 94 extends through aligned openings 96 and 97 formed in the members 67 and 68, respectively, and the threaded end of the bolt is threaded into a rotatable pin 98 that is rotatably mounted in an opening 99 formed in the member 68. The bore 96 in the member 67 terminates in a counterbore 100 in which is mounted a plug 101 against which the head 95 of the bolt may seat. The diameters of the bores 96 and 97 are somewhat larger than the diameter of the shank of the bolt 94.

When it is desired to overcome the force of the springs 87 and move the members 67 and 68 toward one another, the bolt 94 is turned so as to effect engagement between its head 95 and the block 101, whereupon continued rotation of the bolt will force the members 67 and 68 toward one another thereby rocking the rollers 80 and 84 in a direction to increase the space between the aforementioned planes an amount to admit the member 65 between the sets of rollers. Thereafter, the bolt 94 may be rotated in the opposite directions so as to permit the spring 87 to exert a force on the members 67 and 68 tending to move them apart, thereby forcibly, but yieldably, trapping the member 65 between the sets of rollers with the roller 63 firmly engaging the surface 64 and the two rollers 80 and 84 firmly engaging the opposite surface 66.

The capacity of the force transmitting means 86 should be such as to enable it to withstand and resist the normal forces to which the motion transmitting apparatus may be subjected without yielding. However, should the normal forces be exceeded, the yieldability of the apparatus 86 will provide a safeguard against damage.

Figure 7:
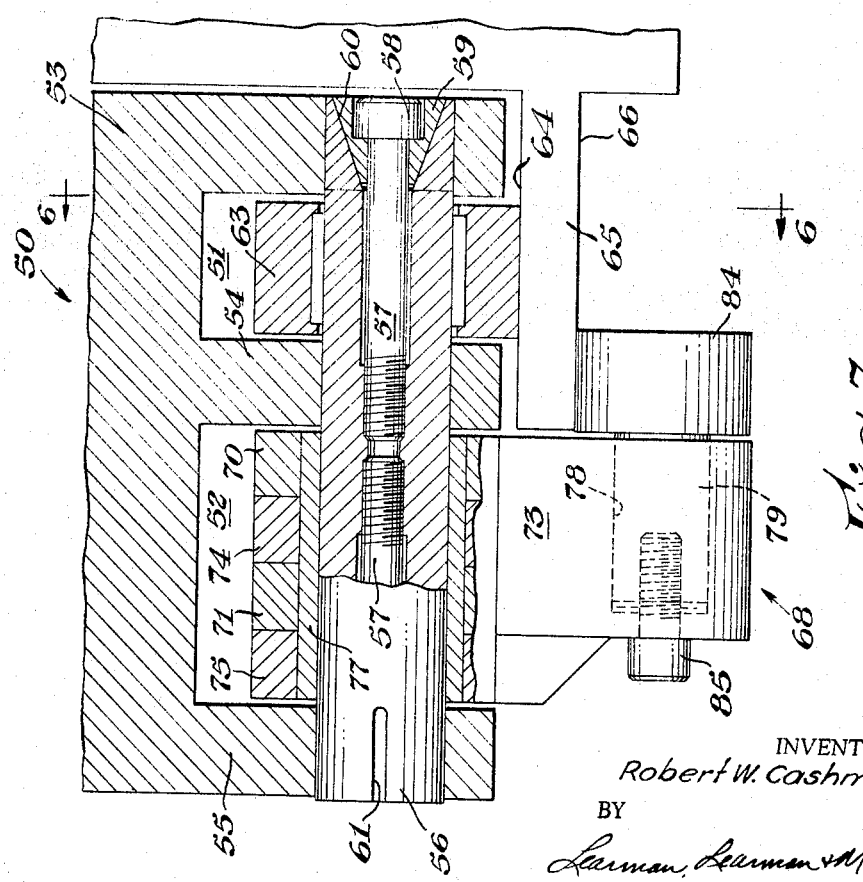
FIGURE 7 is a sectional view taken on the line 7—7 of FIGURE 6.
Figure 8:
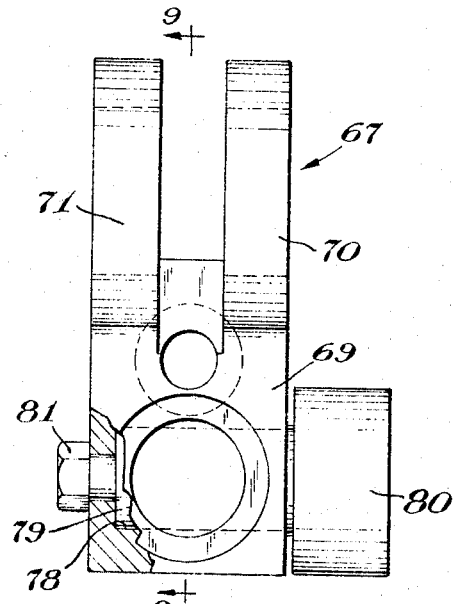
FIGURE 8 is an end elevational view, partly in section, of a portion of the apparatus shown in FIGURE 6.
Figure 9:
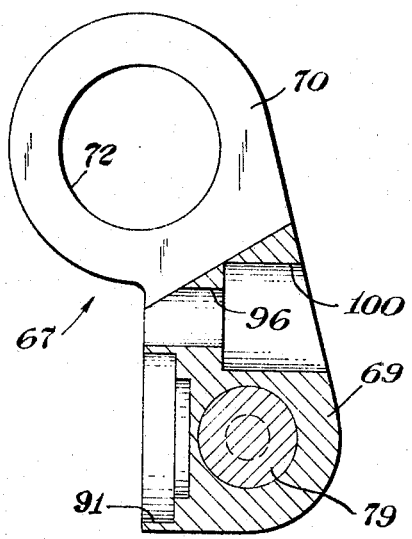
FIGURE 9 is a sectional view taken on the line 9—9 of FIGURE 8.

Should either of the members 50 or 65 move vertically from the positions shown in FIGURE 7, the motion of one member will be transmitted by the clamp device to the other. Should either member move in a horizontal plane, however, the rollers will roll along the opposed surfaces without effecting relative vertical movement of the members.

The disclosed embodiments are representative of presently preferred forms of the invention, but are intended to be illustrative rather than definitive thereof. The invention is defined in the claims.

I claim:

1. A clamp device for exerting clamping forces on two opposed surfaces of a member, said device comprising rotatable first clamp means having a clamp surface; first means rigidly mounting said first clamp means for free rotation about a fixed axis; second rotatable clamp means having a clamping surface; second mounting means mounting said second clamp means for rotation about an axis parallel to and spaced from the axis of rotation of said first clamp means and for movement relative to the axis of rotation of said first clamp means, the spacing between said axes normally being such as to permit said member to be interposed between said first and second clamp means whereby said first and second clamp means may engage opposed surfaces of said member; resilient force transmitting means reacting between said first and second mounting means and normally forcibly urging said second clamp means in a direction to clamp said member between said first and second clamp means; and normally inactive means connected to said second clamp means and operable to overcome the force of said force transmitting means and effect movement of said second clamp means in a direction to release said member.

2. The construction set forth in claim 1 wherein said second mounting means comprises a pair of arms journaled on said first mounting means.

3. The construction set forth in claim 2 wherein said arms are journaled for rocking movements about a common axis.

4. The construction set forth in claim 3 wherein said first clamp means is rotatable about said common axis.

5. The construction set forth in claim 1 wherein said force transmitting means normally urges said arms to rotate about their journals in opposite directions.

6. The construction set forth in claim 5 wherein said force transmitting means comprises a spring device interposed between said arms.

7. A clamp device for exerting clamping forces on opposed, spaced apart surfaces of a member, said device comprising supporting means; first clamp means supported on said supporting means for engagement with one surface of said member; mounting means supported on said supporting means for linear reciprocating movements toward and away from said first clamp means relative thereto; second clamp means supported on said mounting means for movements therewith in directions toward and away from the opposed surface of said member; resilient force transmitting means acting on said mounting means and urging the latter and said second clamp means in a direction toward said opposed surface; means journaling said mounting means on said supporting means for rocking movements relative thereto; stabilizing means reacting between said supporting means and said mounting means in at least one relative position of said supporting means and said mounting means to disable relative rotation thereof; and adjusting means connected to said stabilizing means operable to adjust the latter linearly to and from said one position.

8. A clamp device for exerting clamping forces on opposed, spaced apart surfaces of a member, said device comprising a body member; first clamp means; first means mounting said first clamp means on said body member; second clamp means; second means mounting said second clamp means on said body member for linear movements toward and away from said first clamp means and for rocking movements about an axis; guide means supported by said body member; stabilizing means movably supported by said second mounting means and cooperable with said guide means for preventing rocking movements of said second clamp means in at least one relative position of said first and second clamp means; and means connected to said stabilizing means for moving the latter relatively to said second mounting means to and from said one position.

9. The device set forth in claim 8 wherein said body member comprises a pair of parallel arms between which said second clamp means is mounted.

10. The device set forth in claim 8 wherein said guide means comprises a groove formed in said body member and wherein said stabilizing means extends into said groove.

References Cited by the Examiner

UNITED STATES PATENTS

| | | | |
|---|---|---|---|
| 293,826 | 2/1884 | Way | 269—254 X |
| 486,124 | 11/1892 | Rager | 269—254 X |
| 1,261,723 | 4/1918 | Duffy | 269—254 X |
| 1,832,639 | 11/1931 | Kneeland. | |
| 2,093,658 | 9/1937 | Hildenbrand | 269—254 X |
| 2,460,701 | 2/1949 | Marshall | 24—254 |
| 3,076,645 | 2/1963 | Neuwirth | 269—254 X |

FOREIGN PATENTS 1,274,835  9/1961  France.

WILLIAM FELDMAN, *Primary Examiner.*

D. GRIFFIN, *Assistant Examiner.*